Patented Jan. 22, 1946

2,393,240

UNITED STATES PATENT OFFICE 2,393,240

IMPROVEMENTS IN EXOTHERMIC CHEMICAL REACTIONS

Henry Dreyfus, London, England; Claude Bonard administrator of said Henry Dreyfus, deceased No Drawing. Application June 27, 1942, Serial No. 448,837. In Great Britain May 15, 1941

4 Claims. (Cl. 260—524)

This invention relates to improvements in carrying out chemical reactions and, more particularly, strongly exothermic chemical reactions.

The catalytically active materials which are commonly employed to assist chemical reactions are often used in conjunction with other materials of little or no catalytic activity. These latter materials are variously referred to as supports, carriers, or diluents and their use is chiefly one of economy in that a given weight of the catalytically active material can be given considerably greater surface than it normally possesses, by being spread over the surface of the material of little or no activity. In this way quite a small quantity of catalyst can be used to fill a large reaction zone. Furthermore, catalytically active substances are often used in conjunction with other substances of little or no activity which are employed to give mechanical strength to the catalyst mass as a whole, this technique usually being adopted when the catalytically active material is a powder which cannot otherwise be formed into pellets or small pieces which will retain their shape during use. However, the various methods of using the supports, carriers or diluents have the common feature that these materials are intimately associated with and, in fact, bonded to the catalytically active material used.

The present invention is concerned with a novel method of employing catalytically active materials in conjunction with other materials of little or no catalytic activity, whereby considerable advantages accrue in strongly exothermic chemical reactions.

According to the invention chemical reactions, and especially strongly exothermic chemical reactions, are carried out in presence of a solid catalytic material mixed with a material of little or no catalytic activity, both materials being in the form of discrete granules with their surfaces exposed to the substances taking part in the chemical reaction.

It has been found that by using material of little or no catalytic activity in the manner referred to, considerable improvements can be obtained in the chemical processes, especially in the case of the partial combustion of organic compounds and other strongly exothermic chemical reactions, where the quantity of heat liberated is so great that there is a danger of the reaction proceeding with such vigour that the starting material or desired product is wholly or partly destroyed.

It should be emphasized that the essential feature of the process is that both the catalyst and the material of little or no catalytic activity should be in contact with the reagents employed in the chemical process in which the catalyst is used, and thus the use of a carrier in the ordinary sense, i. e., merely as a vehicle upon which the catalyst is supported as a coating, will not give the results obtainable by the present invention. On the other hand, the catalyst may be supported on a carrier in the normal manner and the supported catalyst mixed with the material of little or no catalytic activity, so that, where an expensive catalyst is used, the economic advantages of the ordinary type of carrier may be obtained as well as the novel effects obtainable by the use of the present invention.

The composition of the material of little or no catalytic activity is not of importance, it being understood that the material is mechanically strong and does not tend to disintegrate during use. Pumice is of general application but other substances, e. g. silica, glazed or unglazed porcelain and, for low temperatures, glass, may also be used.

The size of the particles of catalyst and material of little or no catalytic activity is usually determined by such factors as the dimensions of the reaction chamber and the permissible impedance to the reactant gases or vapours to be passed through the chamber, and does not usually affect the activity of the catalyst itself. In the present case it is convenient to use the catalyst or supported catalyst in granules of the same size as the material of little or no catalytic activity. The amount of the latter material used may be varied somewhat, according to the chemical reaction concerned, but usually it is desirable to use more than one volume of the material, for instance 3 to 5 volumes, to each volume of catalyst or supported catalyst, while an even larger quantity of the material, e. g., representing ten, fifteen or more times the volume of the catalyst or supported catalyst, may be used if desired. While excellent results have been obtained by thorough admixture of catalyst and the material of little or no catalytic activity, the invention is not limited to the use of a uniform mixture. Thus, if desired, the mixture may contain less catalyst at the beginning of the reaction zone than at later points, the proportion of catalyst to material of little or no catalytic activity rising in the direction of flow of the reagents through the reaction zone.

Furthermore, the catalyst and material of little or no catalytic activity may be arranged in layers, if desired varying in number and/or thickness;

thus, at the beginning of the reaction zone there may be more or thicker layers of material of little or no catalytic activity than catalyst, later the two materials may be in layers of equal number and thickness while, later still, the number of thickness of the catalyst layers may be greatest and, in fact, only catalyst may be present.

As previously indicated, the invention is of special importance in connection with the partial oxidation of organic compounds, and enables this type of process to be carried out so as to give improved yields and conversions to the desired product without increasing at the same time the quantity of starting material which undergoes too extensive oxidation. Thus the oxidation of toluene to benzoic acid is a reaction which has been found to benefit considerably by the application of the present invention, by means of which it has been found possible to obtain excellent yields of benzoic acid, together with some benzaldehyde, even when operating so as to obtain a high conversion on the toluene introduced into the reaction zone. This reaction has been carried out most efficiently at temperatures of from 250–400° C., and especially temperatures in the neighbourhood of 300–350° C., using as a catalyst granular tin vanadate, and using this catalyst mixed with 3–5 times its volume of pumice granules of the same size. Other oxidation catalysts may, however, be used, although vanadium compounds usually give very satisfactory results in this type of oxidation, which includes not only the oxidation of toluene, but also of other aromatic hydrocarbons, for instance, of naphthalene to produce phthalic anhydride and of benzene to produce maleic acid. The oxidation of hydrocarbons other than aromatic hydrocarbons can also be carried out in the manner described and, in this connection, the oxidation of ethylene to ethylene oxide is of importance. Silver is the catalyst which is generally regarded as the most suitable catalyst for this particular process and, in view of its expense, it is commonly employed as a deposit upon a suitable support which may be granular in form, although it has also been suggested to use the silver as a thin film upon a continuous surface. By using the silver as a deposit upon a granular material and mixing the catalyst thus formed with a material of little or no catalytic activity the ratio of ethylene oxide to carbon dioxide produced especially at temperatures of the order of 200–300° C. can be considerably improved.

The invention can also be applied to the oxidation of compounds other than hydrocarbons, for instance of alcohols to aldehydes. Thus ethyl alcohol can be oxidised to acetaldehyde by means of oxygen at temperatures of 300–500° C., and in the presence of copper and silver catalysts, by employing the catalyst in the manner described above. This process can be very considerably improved, in particular by permitting higher throughputs without causing an excessive rise of temperature in the reaction zone with subsequent destruction of starting material or the desired reaction product.

In the partial oxidation of organic compounds including both hydrocarbons, such as toluene and ethylene, and also oxygen-containing compounds, such as ethanol, the quantity of oxygen used may be equal to or less than or more than that theoretically required for the formation of a 100% yield and conversion to the desired product or products. In many cases it is desirable to use an excess of oxygen and this is especially so when the process is being operated with a view to obtaining high conversions. For instance, in the oxidation of toluene to benzoic acid it has been found advantageous to use at least twice the theoretical quantity of oxygen and preferably even more than this, for example, 5 or more, e. g. up to ten times the quantity of oxygen theoretically required. In all such processes gaseous and/or vaporous diluents may be used and are of considerable value in such processes where an excess of oxygen over that theoretically required is employed. Steam offers considerable advantages as a diluent in assisting a proper control of the reaction temperature and has been found in some cases, e. g. in the oxidation of toluene, to lead to considerably better results than with any other diluent. Gaseous diluents, such as nitrogen, may however be employed wholly or partly in place of steam and a very convenient way of carrying out the process consists of passing air enriched with nitrogen together with steam and the compound to be subjected to oxidation through a reaction vessel, subjecting the products to condensation and recycling the uncondensed gases through the reaction zone after replacing substances used up in the oxidation or removed by the condensation. This method has been adopted with success in the oxidation of toluene where it has been found advantageous to use a considerable quantity of both nitrogen and steam as diluting materials; thus operating at a temperature in the neighbourhood of 300° C. it has been found best to use for each molecular proportion of toluene 4–6 of oxygen, 250–300 of nitrogen and 40–60 of steam.

The invention may be applied to exothermic processes other than oxidations with air or oxygen, for instance to the synthesis of hydrocarbons from oxides of carbon and hydrogen. This process is one which is usually carried out at fairly low temperatures of the order of 200° C. under atmospheric pressure or very slightly increased pressure where liquid hydrocarbons are the desired products. Under these conditions, it has been found essential to avoid even the smallest temperature fluctuations if a high yield of liquid hydrocarbons is to be obtained, and if the catalysts are to retain their activity for a useful period of time. The present invention is of great assistance in attaining the results, whether the process is one involving the use of a catalyst in which the chief ingredient is iron or one in which the more active nickel or cobalt type of catalyst is used.

The following examples illustrate the invention as applied to the oxidation of toluene to produce benzoic acid.

*Example 1*

The catalyst used consists of a precipitated tin vanadate in granular form graded 10 to 20 mesh per inch. This catalyst is charged into a reaction tube heated to a temperature of 300° C. and a mixture of toluene vapour, steam and air passed into the tube in the proportions of 25 grams toluene/2000 litres of steam/230 litres of air/per litre of catalyst/per hour, the volumes of the steam and air being calculated at normal temperatures and pressures.

Under these conditions about 50% conversion per passage to benzoic acid is obtained together with some formation of benzaldehyde, but a considerable quantity of the toluene which should be recovered is, in fact, oxidised completely to carbon dioxide. Under substantially identical conditions, however, except that one-fifth of the volume of catalyst is used and this catalyst is mixed with four times its volume of pumice granules of 10 to 20 mesh, the conversion to benzoic acid remains substantially unchanged, a slight increase in the amount of benzaldehyde occurs, while there is a substantial reduction in the amount of toluene which is completely oxidised.

*Example 2*

When using conditions somewhat less favourable for the production of benzoic acid, the value of the invention is even more strikingly demonstrated. Using a very active tin vanadate catalyst and passing the toluene, steam, air mixture at a rate represented by 50 grams toluene/300 litres of air/300 litres of steam/per litre of catalyst/per hour substantially complete oxidation of the toluene passed to carbon dioxide occurs. By substituting for the catalyst one-fifth of its volume of the same catalyst mixed with four times its volume of pumice, the quantity of toluene completely oxidised is reduced to about one-third, and, at the same time, a fair yield of benzoic acid and benzaldehyde is obtained.

Having described my invention what I desire to secure by Letters Patent is:

1. Process for the partial oxidation of aromatic hydrocarbons containing an alkyl side-chain with the aid of a solid catalytic material, wherein said catalytic material is mixed with 3–5 times its volume of a material of substantially no catalytic activity, both materials being in the form of discrete granules of substantially equal size and about 10–20 mesh with their surfaces exposed to the substances taking part in the chemical reaction, and the oxidation is carried out with the aid of more than the theoretical quantity of oxygen and in the presence of substantial proportions of nitrogen and steam as diluents.

2. Process for the partial oxidation of toluene for the production of benzoic acid with the aid of a solid catalytic material, wherein said catalytic material is mixed with 3–5 times its volume of a material of substantially no catalytic activity, both materials being in the form of discrete granules of substantially equal size and about 10–20 mesh with their surfaces exposed to the substances taking part in the chemical reaction, and the oxidation is carried out with the aid of more than the theoretical quantity of oxygen and in the presence of substantial proportions of nitrogen and steam as diluents.

3. Process for the partial oxidation of toluene for the production of benzoic acid with the aid of a solid tin vanadate catalyst, wherein said tin vanadate catalyst is mixed with 3–5 times its volume of a material of substantially no catalytic activity, both materials being in the form of discrete granules of substantially equal size and about 10–20 mesh with their surfaces exposed to the substances taking part in the chemical reaction, and the oxidation is carried out with the aid of more than the theoretical quantity of oxygen and in the presence of substantial proportions of nitrogen and steam as diluents.

4. Process for the partial oxidation of toluene for the production of benzoic acid with the aid of a solid catalytic material, wherein said catalytic material is mixed with 3–5 times its volume of a material of substantially no catalytic activity, both materials being in the form of discrete granules of substantially equal size and about 10–20 mesh with their surfaces exposed to the substances taking part in the chemical reaction, and the oxidation is carried out at a temperature of about 300° C. and in the presence of 4 to 6 mols of oxygen, 250 to 300 mols of nitrogen and 40 to 60 mols of steam for each molecular proportion of toluene.

HENRY DREYFUS.